United States Patent [19]

Cur et al.

[11] Patent Number: 5,082,335
[45] Date of Patent: Jan. 21, 1992

[54] VACUUM INSULATION SYSTEM FOR INSULATING REFRIGERATION CABINETS

[75] Inventors: Nihat O. Cur, St. Joseph Township, Berrien County; Richard W. Kruck, Sodus Township, Berrien County; William S. White, St. Joseph; David B. Kirby, St. Joseph Township, Berrien County, all of Mich.

[73] Assignee: Whirlpool Corporation, Benton Harbor, Mich.

[21] Appl. No.: 452,063

[22] Filed: Dec. 18, 1989

[51] Int. Cl.⁵ .............................................. F25D 11/00
[52] U.S. Cl. .................................... 312/401; 52/406; 62/DIG. 13
[58] Field of Search .......................... 312/214; 52/406; 62/D13; 220/420, 425

[56] References Cited

U.S. PATENT DOCUMENTS

| | | |
|---|---|---|
| 2,768,046 | 10/1956 | Evans . |
| 2,779,066 | 1/1957 | Gaugler et al. . |
| 2,863,179 | 12/1958 | Gaugler et al. . |
| 2,989,156 | 6/1961 | Brooks et al. . |
| 3,179,549 | 4/1965 | Strong et al. . |
| 3,264,165 | 8/1966 | Stickel . |
| 4,000,246 | 12/1976 | Walles . |
| 4,444,821 | 4/1984 | Young et al. . |
| 4,529,638 | 7/1985 | Yamamoto et al. . |
| 4,662,521 | 5/1987 | Moretti . |
| 4,668,551 | 5/1987 | Kawasaki et al. . |
| 4,668,555 | 5/1987 | Uekado et al. . |
| 4,669,632 | 6/1987 | Kawasaki et al. . |
| 4,681,788 | 7/1987 | Barito et al. . |
| 4,683,702 | 8/1987 | Vis . |
| 4,702,963 | 10/1987 | Phillips et al. . |
| 4,726,974 | 2/1988 | Nowobilski . |

Primary Examiner—Kenneth J. Dorner
Assistant Examiner—Gerald A. Anderson
Attorney, Agent, or Firm—Hill, Van Santen, Steadman & Simpson

[57] ABSTRACT

A refrigeration appliance having a vacuum insulation system wherein a combination of vacuum thermal insulating panels and polyurethane foam provide the thermal insulating properties as well as structural support. The panels are to be spaced apart from one another with a space between the cabinet and appliance liner so that the foam will lock the panels in place. Also the panels are to be spaced from the corners of the cabinet to permit the foam to flow into the corners. The panels can be applied directly to the cabinet or they can be spaced between the cabinet and liner, held by spacers. In either case, an adhesive is used to hold the liners in position prior to introduction of the foam.

19 Claims, 2 Drawing Sheets

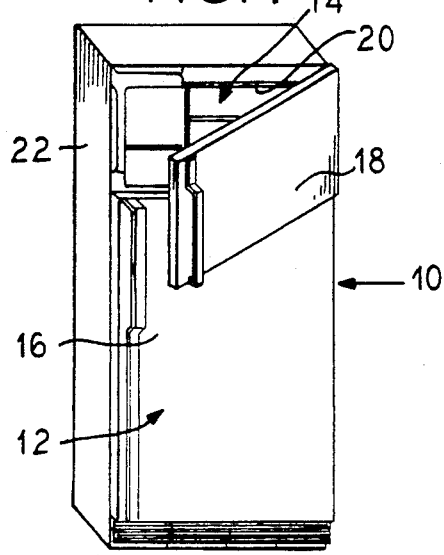
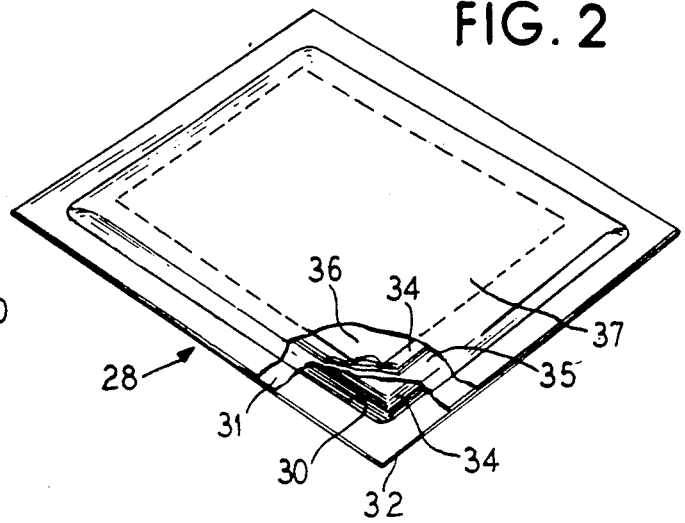
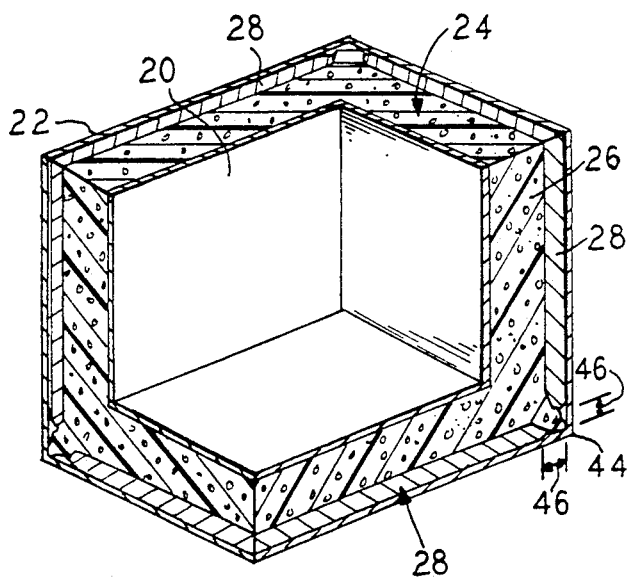
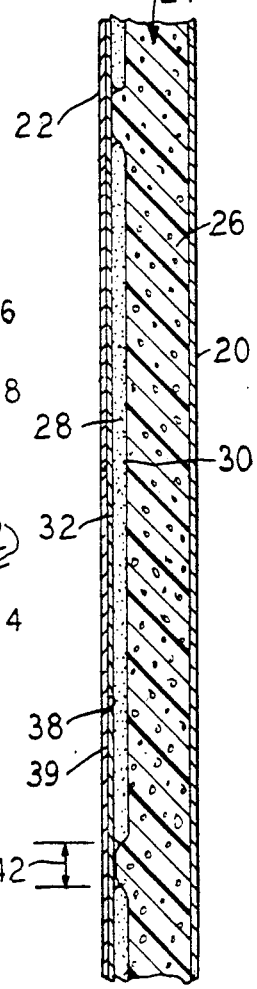
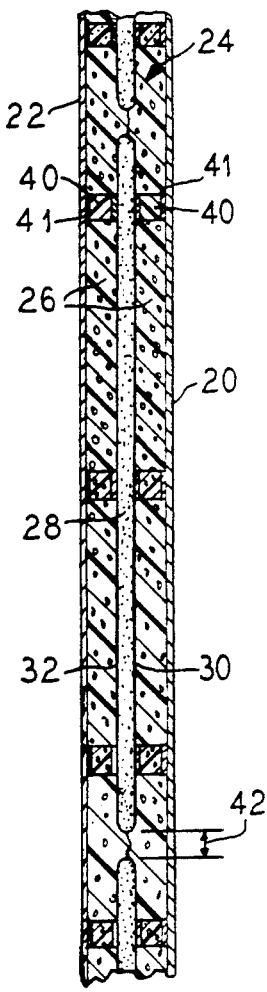

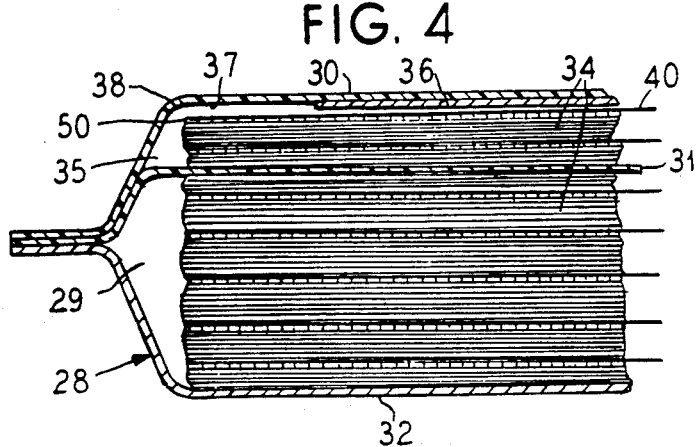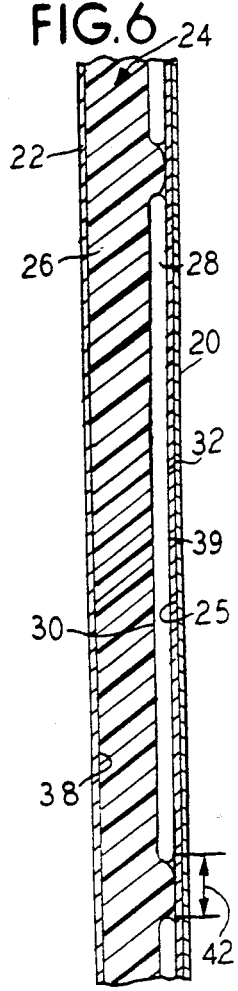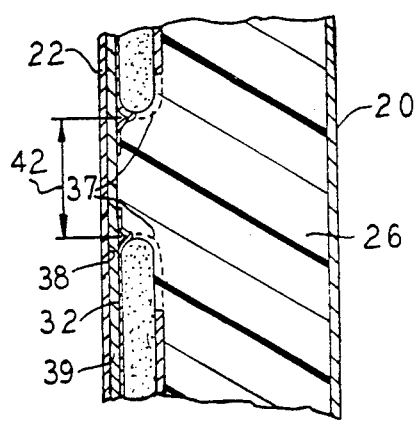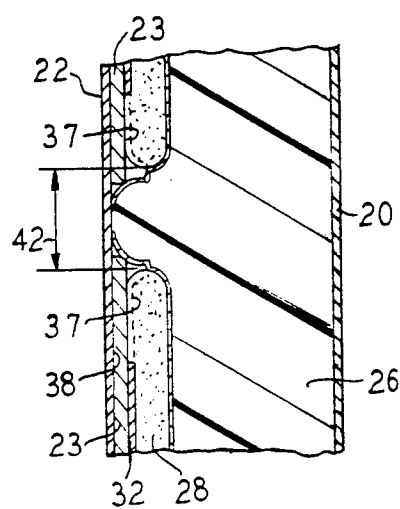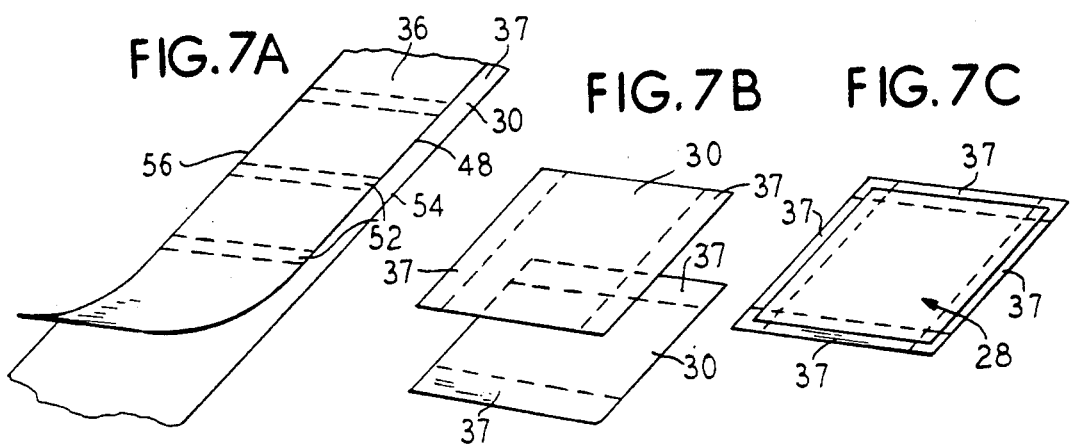

VACUUM INSULATION SYSTEM FOR INSULATING REFRIGERATION CABINETS

BACKGROUND OF THE INVENTION

This invention relates to a domestic refrigeration appliance and more particularly to a vacuum insulation panel system for use in such appliances.

Vacuum insulation panels are known for use in refrigerator cabinets. For example, U.S. Pat. No. 4,681,788 discloses a vacuum thermal insulation panels used in combination with conventional foam or fiberglass insulation in the walls of the refrigerator. Locks are utilized to space the panel a fixed distance away from the cabinet. There is no discussion to thermal breaks in the panel film nor any discussion relating to spacing of adjacent panels.

U.S. Pat. No. 4,669,632 discloses a vacuum thermal insulation panel which may be used in combination with foam in a refrigerator cabinet. The panel is disclosed as including a thermal break in the barrier film, however there is no disclosure relating to which direction the thermal break should face in the refrigerator cabinet wall, nor is there any discussion relative to how such a thermal break can be incorporated into the vacuum panel construction in a practical manner. Also, there is no discussion regarding the spacing of adjacent panels in the refrigerator walls.

U.S. Pat. No. 4,668,551 discloses a vacuum thermal insulation panel which may be used in combination with either chlorofluorocarbon gas and/or carbon dioxide-blown foam. No discussion is provided relative to thermal breaks or spacing of adjacent panels.

U.S. Pat. No. 3,264,165 discloses a gas-filled insulating panel surrounded by foam. The specification discloses a thin layer of foam attached to the panel.

U.S. Pat. No. 2,863,179 and U.S. Pat. No. 2,817,123 discloses gas-filled insulation panels used in combination with fiberglass batts. The two types of insulation are sealed together in a bag for ease of handling.

U.S. Pat. No. 2,779,066 discloses a gas-filled insulation panel used with glass fiber batts without an outer bag.

U.S. Pat. Nos. 2,768,046 and 2,728,958 discloses insulation systems for refrigerators using vacuum panel insulation in combination with fiberglass or a similar "massive atmospheric insulation". The corners of the cabinet are to be filled with atmospheric insulation such as glass fiber insulation to minimize the effective edge losses between the panels. Such insulation is not utilized to lock the panels in place or to provide any structural stability to the refrigeration appliance.

It would therefore be an improvement in the art to provide an insulation system for a refrigeration appliance that enhances the thermal insulating qualities of the insulation system while continuing to provide structural stability to the refrigeration appliance.

SUMMARY OF THE INVENTION

The present invention provides an improved insulation system for a refrigeration appliance in which vacuum panels are used in conjunction with polyurethane foam insulation to maximize the thermal efficiency and structural rigidity of the cabinet. Vacuum insulation panels, such as those described in copending patent application Ser. No. 451,830, now U.S. Pat. No. 5,018,328, entitled "Multi-Compartment Vacuum Insulation Panels", filed simultaneously herewith and assigned to the same assignee as this application, would provide excellent thermal resistance to the heat gain to the refrigeration appliance cabinet on their own. For example, a typical powder-filled vacuum insulation panel with a 0.625 inch thickness would provide the same insulating value as a 2-inch thick polyurethane foam (F-11 blown) slab. The thickness of the vacuum insulation panel with the multilayered fine fiberglass paper filler and reflective layers would need to be only 0.25 inches to match the 2-inch thick polyurethane foam performance. However, the design of the present day refrigeration appliance cabinets preclude the usage of vacuum insulation panels alone. The polyurethane foam insulation used in today's refrigeration appliances act as a structural member of the cabinet in addition to providing a good thermal insulation medium. Therefore the present invention utilizes a combination of the relatively thin vacuum insulation panels with the polyurethane foam.

The vacuum insulation panels may be adhesively bonded, such as by spray-on adhesive or double backed adhesive tape, to the inner side of the refrigeration appliance outer wrapper or the inner liner surface facing the polyurethane foam. Best results are obtained only when the thermal break section of the vacuum panels are properly positioned during the application to a refrigerator so that the thermal break does not lose its intended function. The thermal break side of the vacuum panels should either be placed facing the polyurethane foam interface, or be protected from the secondary wall (especially if it is a metal wall such as a refrigeration appliance wrapper) by a thermal insulating medium such as foam tape.

The present invention also provides methods to incorporate a thermal break design for barrier film and panel constructions so that a practical vacuum insulation system can be built to insulate the refrigerator cabinets. The barrier film which allows for effective thermal breaks and economical panel construction is most economically manufactured in a continuous roll. The various layers including some metallized ones are laminated together, and a gap is provided between the edge of the barrier film and the edge of the metal foil layer to create a thermal break on two edges of the panel. Periodic rows of interruptions are cut in the metal foil across the barrier film. This provides a thermal break for the remaining two edges of the vacuum panel.

An alternate method of obtaining thermal break with a continuous roll barrier film is to laminate a web of plastic film with a metal foil layer to a web of metallized high barrier plastic film. The metal foil is slightly narrower than the metallized plastic film and centered on it so that the metal foil layer does not extend to the edges of the high barrier film. Two pieces of such a barrier film are cut and one is oriented 90° relative to the other to form a thermal break at each edge of the vacuum panel.

When multiple panels are used in a given wall, an inch or two of spacing should be provided between them to allow the foam to come in between the panels to lock them firmly in place and provide a stronger structure. With respect to placement of the panels near the corners of the refrigeration appliance, the side edges of the panels should be spaced from, but less than one inch from the outer cabinet surface, and to increase the structural integrity of the cabinet, the polyurethane foam should be allowed to cover the cabinet edges and corner sections where the side walls and top wall meet each other.

Finally, the vacuum insulation panels should be strategically placed in the refrigeration appliance cabinet walls for the most economical manufacturing cost yet providing the best energy efficiency that can be obtained in the product operation. That is, if a limited number of vacuum panels are to be used in insulating the refrigerator cabinet walls with partial coverage of the total surface area available for insulation, it is best in practice to insulate the cabinet walls adjacent to the freezer section only, not the fresh food compartment.

The panels may be attached directly to the interior faces of the cabinet walls or the panels may be supported by spacers a fixed distance away from the outer wrapper and the inner liner such that after foaming, the panels will be completely surrounded by foam.

BRIEF DESCRIPTION OF THE DRAWINGS

FIG. 1 is a front perspective view of a refrigeration appliance embodying the principles of the present invention.

FIG. 2 is a perspective view of a vacuum insulation panel to be used in the insulation system of the present invention particularly cut away to show the internal layers thereof.

FIG. 3 is a perspective sectional view of a corner of the freezer compartment of the refrigeration appliance illustrating the insulation system of the present invention.

FIG. 4 is a greatly enlarged side sectional view of a portion of a vacuum insulation panel embodying the principles of the present invention.

FIG. 5A is a side sectional view of an embodiment of a wall section of the insulation system of the present invention.

FIG. 5B is a close-up section of a portion of FIG. 5A showing placement of a vacuum panel insulation with an example of proper thermal break orientation within a refrigeration appliance wall.

FIG. 5C is another close-up view of a wall section with an alternative thermal break orientation and vacuum panel placement within a refrigeration appliance wall.

FIG. 6 is a side sectional view of an alternative embodiment of a wall section of the insulation system of the present invention.

FIG. 7A is a perspective view of the assembly of a web of barrier film material.

FIG. 7B is a perspective view of the assembly of two pieces of barrier film web together.

FIG. 7C is a perspective view of the assembled barrier film webs of 7B.

FIG. 8 is a side sectional view of an alternative embodiment of a wall section of the insulation system of the present invention.

DETAILED DESCRIPTION OF THE PREFERRED EMBODIMENTS

In FIG. 1 there is illustrated a refrigeration appliance generally at 10 which comprises a refrigerator compartment 12 and a freezer compartment 14 located above the refrigerator compartment 12. Of course other refrigerator appliances such as those having only a refrigerator compartment or only a freezer compartment or different arrangements of refrigerator and freezer compartments could employ the present invention. The particular refrigeration appliance illustrated is only a single example of a type of refrigeration appliance that could utilize the present invention.

Each of the compartments 12, 14 is accessed by means of a separate door 16, 18. The compartments are defined by an interior liner wall 20 (FIGS. 3, 5A, 5B, 5C and 6) which is spaced within an exterior outer wrapper 22 comprising the refrigeration appliance cabinet. A space 24 between the liner 20 and the wrapper 22 is normally filled with an insulation material 26 such as polyurethane foam which is injected into the space 24 in a liquid state where it expands and hardens into a solid state to form a structural part of the cabinet as well as providing a thermal barrier necessary to minimize the heat leakage to the interior compartments so that the food can be refrigerated in an energy efficient manner.

The present invention provides an improved insulation system for the refrigerator cabinet wall wherein a plurality of vacuum insulation panels 28 (FIG. 2) are inserted in the space 24 between the liner 20 and the wrapper 22 to enhance the insulation property of the insulation system. Polyurethane foam 26 is also used in the system to provide additional insulation, the structural support it normally provides and to assist in holding the panels 28 in place between the walls 20, 22.

The present invention also suggests the usage of the vacuum panels 28 in the wall sections adjacent to the freezer compartment 14 only, if limited, yet the most economical vacuum application and energy-efficient operation of the refrigeration appliance 10 are desired. Since a considerable portion of heat gain to the refrigeration appliance cabinet 10 is through the refrigeration appliance walls adjacent to the freezer compartment 14 (due to larger temperature gradient), application of the vacuum panels 28 to the walls adjacent the freezer compartment 14 should be the first priority if only partial vacuum panel coverage is considered.

As disclosed in the referenced copending application, each of the vacuum insulation panels 28 is preferably constructed with a pair of gas impermeable outer film walls 30, 32 (FIG. 4) and at least one gas impermeable inner wall 31 to form at least two adjacent compartments 29, 35 (FIG. 4) enclosing one or more microporous filler insulation materials 34 that support the barrier film walls 30, 31, 32 of the panel when atmospheric gases are evacuated from the interior compartments 29, 35 of the multicompartment vacuum insulation panels disclosed in the copending patent application. The two outer walls 30, 32 and one inner wall 31 (FIG. 4) or more are hermetically sealed to each other about their outer edges or periphery to define at least two vacuum sealed compartments 29, 35 (FIG. 4) or more. Of course, the vacuum panels, 28 do not necessarily have to be of the multicompartment type and can be a conventional single compartment panel. Regardless of whether the vacuum panels 28 are the multicompartment or the single compartment type, the barrier film comprising an outer layer of metallized or nonmetallized plastic laminates and a layer of metal foil 36 laminated to an inner surface 30A of the metallized or nonmetallized plastic laminate barrier film has the best permeability characteristic, that is, will maintain the vacuum conditions within the panel 28 for the longest period of time. However, such metal foil laminated barrier films transmit heat along their length and thus it becomes necessary to provide a thermal break 37 in the form of a spacing or gap in the metal foil 36, preferably on the order of one quarter inch or larger to prevent the conduction of heat around the exterior of the panel 28 from the hot to the cold side of the vacuum panel 28.

To manufacture the panels with a thermal break in an economical manner, Applicants have determined a practical method which can be utilized to make high barrier films with a thermal break. As illustrated in FIG. 7A, preferably the barrier film 30 having a thermal break 37 is manufactured in a continuous roll. Various layers are laminated together and the thermal break or gap 37 is provided between lateral edges 54, 56 of the roll or web of film 30 and lateral edges 48, 50 of the metal foil layer 36 which is applied directly to and laminated to the film web 30. Periodic rows of interruptions 52 may be provided along the length of the metal foil 36 so as to provide a break between adjacent foil strips. These interruptions would then appear at the edges of the cut sheets.

An alternate method of obtaining a thermal break with a continuous roll of barrier film 30 is illustrated in FIGS. 7B and 7C wherein the metal foil 36 is laminated directly to the barrier film roll, with its lateral edges 48, 50 spaced inwardly of the lateral edges 54, 56 of the barrier film. Generally square pieces are severed from the barrier film and are joined to one another with one of the square pieces rotated 90° relative to each other. Thus the thermal breaks 37 will form all four edges of the final assembled panel as illustrated in FIG. 7C. Webs of different widths can be utilized if it is desired to construct rectangular panels that are not square.

Applicants have determined that a most advantageous orientation of the panel is to place the wall 30 of the panel 28 with the thermal break 37 against the polyurethane foam 26 interface whether the panels 28 are adhesively bonded to the wrapper 22 (FIGS. 5A and 5B) or the liner 20 (FIG. 6). This orientation of the thermal break 37 will allow it to properly function. If it becomes necessary to attach the wall 30 of the panel 28 with the thermal break 37 against a secondary metal surface such as the wrapper 22, then the thermal break 37 section of the vacuum panel should be protected from the secondary wall by a thermal insulating medium 23 such as foam tape (FIG. 5C). In addition, the metal foil 36 layer should be on the side of the barrier film 30 facing the inside of the panel 28 (FIG. 8).

The panels 28 may be secured to an inner surface 38 of the cabinet wrapper 22 such as by an adhesive layer 39, for example double sided tape or a spray-on adhesive, as shown in the embodiment of FIG. 5A, or to the inner surface 25 of the liner 20, as shown in the embodiment of FIG. 6. In either event, the side 30 of the panel with the thermal break 37 should preferably be facing the polyurethane foam 26. Alternatively, the panels may be supported between the liner 20 and the shell 22 by spacer blocks 40 as illustrated in FIG. 8. The spacer blocks 40 would also be secured to the wrapper 22 as well as to the liner 20 by an adhesive layer 41.

There should be a spacing 42 (FIGS. 5A and 8) of no less than one half inch and preferably between one and two inches between adjacent panels 28 to permit an interlocking by the polyurethane foam. As best shown in FIG. 3, the panels 28 should be spaced from the corners 44 of the wrapper 22 by some distance 46, preferably less than an inch, yet sufficient to permit the polyurethane foam to flow into the corner to provide structural stability to the corner as well as thermal insulation.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:

1. A refrigeration appliance having an outer cabinet, a liner inside said cabinet, and thermal insulation interposed in a space between said cabinet and said liner, said thermal insulation comprising:

a plurality of vacuum thermal insulation panels, each of said panels comprising at least two hermetically sealed vacuum compartments defined by at least three walls of gas-impermeable barrier film laminate sealed together about their peripheries, said compartments being filled with a microporous filler insulating material and being evacuated of atmospheric gasses, each of said vacuum thermal insulation panels being secured within the space between said liner and said cabinet, and adjacent panels being spaced apart from each other and from the corners of said cabinet; and polyurethane foam insulation blow into the space between said liner and said cabinet and surrounding and permeating the gaps between said vacuum thermal insulation panels and said corners of said cabinet, said foam providing added thermal insulation and structural rigidity to said cabinet.

2. A refrigeration appliance according to claim 1, wherein said adjacent panels are spaced 1 to 2 inches from each other.

3. A refrigeration appliance according to claim 1, wherein said panels are spaced less than one-inch from the corners of the cabinet.

4. A refrigeration appliance according to claim 1, wherein said refrigeration appliance comprises a freezer compartment and a refrigerator compartment and said panels are substantially placed around said freezer compartment.

5. A refrigeration appliance according to claim 1, wherein each of said vacuum thermal insulation panels comprises an outer wall of gas-impermeable barrier film laminate facing said liner, said gas-impermeable barrier film laminate comprising an outer layer of plastic barrier film laminate and a layer of metal foil laminated to said plastic barrier film laminate, said layer of metal foil terminating a distance from the edges of the barrier film walls of said vacuum thermal insulation panel.

6. A refrigeration appliance according to claim 5, wherein said vacuum thermal insulation panels are secured to said cabinet.

7. A refrigeration appliance according to claim 1, wherein said vacuum thermal insulation panels are adhesively attached to the inside of said cabinet.

8. A refrigeration appliance according to claim 7, wherein said spacers are adhesively attached to said cabinet and said liner.

9. A refrigeration appliance according to claim 1, wherein said vacuum thermal insulation panels are spaced between said liner and said cabinet by spacers.

10. A refrigeration appliance according to claim 1, wherein said thermal insulation panels are adhesively attached to an outside of said liner.

11. A refrigeration appliance having an outer cabinet, a liner inside said cabinet, and thermal insulation interposed in a space between said cabinet and said liner, said thermal insulation comprising:

a plurality of vacuum insulation panels, each of said panels comprising at least one hermetically sealed vacuum compartment defined by at least two walls of gas-impermeable barrier film laminate sealed together about their peripheries, said compartment being filled with a microporous filler insulating material and being evacuated of atmospheric gasses, each of said vacuum thermal insulation panels being secured within the space between said liner and said cabinet, and adjacent panels being spaced apart from each other and from the corners of said cabinet; and polyurethane foam insulation blown into the space between said liner and said cabinet and surrounding and permeating the gaps between said vacuum thermal insulation panels and said corners of said cabinet, said foam providing added thermal insulation and structural rigidity to said cabinet;

wherein each of said vacuum thermal insulation panels comprises an outer wall of gas-impermeable barrier film laminate facing said cabinet, said gas-impermeable barrier film laminate comprising an outer layer of plastic barrier film laminate and a layer of metal foil laminated to said plastic barrier film laminate, said layer of metal foil terminating a distance from each of the edges of the barrier film walls of said vacuum thermal insulation panel, said distance without metal foil protected from said cabinet by an insulating medium at the interface between said vacuum panel and said cabinet.

12. A refrigeration appliance according to claim 11, wherein said vacuum thermal insulation panels are secured directly to said cabinet.

13. A refrigeration appliance having an outer cabinet, a liner inside said cabinet, and thermal insulation interposed in a space between said cabinet and said liner, said thermal insulation comprising:

a plurality of vacuum thermal insulation panels, each of said panels comprising at least one hermetically sealed vacuum compartment defined by at least two walls of gas-impermeable barrier film laminate sealed together about their peripheries, said compartment being filled with a microporous filler insulating material and being evacuated of atmospheric gasses, each of said vacuum thermal insulation panels being secured within the space between said liner and said cabinet, and adjacent panels being spaced apart from each other and from the corners of said cabinet; and polyurethane foam insulation blow into the space between said liner and said cabinet and surrounding and permeating the gaps between said vacuum thermal insulation panels and said corners of said cabinet, said foam providing added thermal insulation and structural rigidity to said cabinet;

wherein each of said vacuum thermal insulation panels comprises a first and a second wall of barrier films, said first wall of barrier film comprising a layer of plastic barrier film laminate forming an outer surface of said first wall of barrier film, and a layer of metal foil laminated to an inner side of said plastic film laminate, wherein said layer of metal foil terminates 0.25 inches or more from the edge of two opposite sides of said outside surface of said vacuum thermal insulation panel thereby forming a thermal break on two edges, and said layer of metal foil terminates at the edge of the remaining two sides of said vacuum thermal insulation panel; and said second wall of barrier film being similar to said first wall of barrier film and sealed to said first wall of barrier film about their perimeters to form said sealed compartment, said second wall of barrier film rotated 90° with respect to said first wall such that a thermal break is disposed on each edge of said vacuum thermal insulation panel.

14. A refrigeration appliance having an outer cabinet, a liner spaced from an inside surface of said cabinet, and thermal insulation interposed in the space between said cabinet and said liner, said thermal insulation comprising:

a plurality of vacuum thermal insulation panels, each of said panels comprising at least three walls of gas-impermeable barrier film laminate sealed together about their peripheries to form two compartments, said compartments being filled with a microporous filler insulating material and being evacuated of atmospheric gases, each of said vacuum thermal insulation panels being secured within the space between said liner and said cabinet, and adjacent panels being spaced apart from each other and from the corners of said cabinet; and polyurethane foam insulation blown into the space between said liner and said cabinet and surrounding and permeating the gaps between said vacuum thermal insulation panels and said corners of said cabinet, said foam providing added thermal insulation and structural rigidity to said cabinet.

15. A refrigeration appliance according to claim 14, wherein said adjacent panels are spaced 1 to 2 inches from each other.

16. A refrigeration appliance according to claim 14, wherein said panels are spaced less than one inch from the corners of the liner.

17. A refrigeration appliance according to claim 14, wherein said refrigeration appliance comprises a freezer compartment and a refrigerator compartment, and said panels are substantially placed around said freezer compartment.

18. A refrigeration appliance according to claim 14, wherein each of said vacuum thermal insulation panels comprises a first and a second wall of barrier films, said first wall of barrier film comprising a layer of plastic barrier film laminate forming an outer surface of said first wall of barrier film, and a layer of metal foil laminated to an inner side of said plastic film laminate, wherein said layer of metal foil terminates 0.25 inches or more from the edge of two opposite sides of said outside surface of said vacuum thermal insulation panel thereby forming a thermal break on two edges, and said layer of metal foil terminates at the edge of the remaining two sides of said vacuum thermal insulation panel; and said second wall of barrier film being similar to said first wall of barrier film and sealed to said first wall barrier film about their perimeters to form said sealed compartment, said second wall of barrier film rotated 90° with respect to said first wall such that a thermal break is disposed on each edge of said vacuum thermal insulation panel.

19. A refrigeration appliance having an outer cabinet, a liner spaced from an inside surface of said cabinet, and thermal insulation interposed in the space between said cabinet and said liner, said thermal insulation comprising:

a plurality of vacuum thermal insulation panels, each of said panels comprising at least two walls of gas-impermeable barrier film laminate sealed together about their peripheries to form a compartment, said compartment being filled with a microporous filler insulating material and being evacuated of atmospheric gases, each of said vacuum thermal insulation panels being secured within the space between said liner and said cabinet, and adjacent panels being spaced apart from each other and from the corners of said cabinet; and polyurethane foam insulation blown into the space between said liner and said cabinet and surrounding and permeating the gaps between said vacuum thermal insulation panels and said corners of said cabinet, said foam providing added thermal insulation and structural rigidity to said cabinet;

wherein each of said vacuum thermal insulation panels comprises an outer layer of gas-impermeable barrier film laminate facing said cabinet inside surface, said gas-impermeable barrier film laminate comprising an outer layer of plastic barrier film laminate and a layer of metal foil laminated to said plastic barrier film laminate, said layer of metal foil terminating a distance from the edges of the film layers of said vacuum thermal insulation panel.

* * * * *